United States Patent
Huang et al.

(10) Patent No.: US 11,258,273 B2
(45) Date of Patent: Feb. 22, 2022

(54) CHARGER CIRCUIT AND CHARGING CONTROL METHOD

(71) Applicant: RICHTEK TECHNOLOGY CORPORATION, Zhubei (TW)

(72) Inventors: Wei-Jen Huang, New Taipei (TW); Shun-Yu Huang, Nantou (TW); Tsung-Wei Huang, Nantou (TW); Shui-Mu Lin, Taichung (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 143 days.

(21) Appl. No.: 16/787,816

(22) Filed: Feb. 11, 2020

(65) Prior Publication Data

US 2020/0358298 A1  Nov. 12, 2020

(30) Foreign Application Priority Data

May 10, 2019  (CN) .......................... 201910388026.0

(51) Int. Cl.
*H02J 7/00* (2006.01)

(52) U.S. Cl.
CPC .......... *H02J 7/0014* (2013.01); *H02J 7/0045* (2013.01)

(58) Field of Classification Search
USPC ................. 320/103, 104, 107, 108, 116, 134
See application file for complete search history.

(56) References Cited

U.S. PATENT DOCUMENTS

| 2005/0062459 | A1* | 3/2005 | Young | H02J 7/00308 320/134 |
| 2013/0314032 | A1* | 11/2013 | Amemiya | H02J 7/0077 320/107 |
| 2014/0015474 | A1* | 1/2014 | Tsai | H02J 7/0014 320/103 |

FOREIGN PATENT DOCUMENTS

| CH | 707447 B1 | * | 7/2017 | ............ H02M 3/158 |
| CN | 104505876 A | * | 4/2015 | |
| CN | 105048602 A | * | 11/2015 | ............ H02J 7/0019 |
| CN | 105932346 A | * | 9/2016 | |
| CN | 108767947 A | * | 11/2018 | |

(Continued)

OTHER PUBLICATIONS

"A 50MHz 5V 3W 90% Efficiency 3-Level Buck Converter with Real-Time Calibration", by Xun Liu et al., Symposium on VLSI Circuits Digest of Technical Papers, 2016.

(Continued)

*Primary Examiner* — Brian Ngo
(74) *Attorney, Agent, or Firm* — Tung & Associates (57) ABSTRACT

A charger circuit which supplies a charging power to charge a battery circuit, includes: a conversion switch circuit, at least one capacitor and a conversion control circuit. The conversion switch circuit is coupled between a charging power and a ground level and includes conversion switches connected in series. The conversion switch circuit has battery voltage balancing nodes electrically connected to the battery circuit, such that each battery is electrically connected between two of the battery voltage balancing nodes. The conversion control circuit is coupled to the conversion switch circuit and provides operation signals to the conversion switch circuit, to respectively control the corresponding conversion switches, so that the capacitor is periodically (Continued)

connected in parallel to each battery of the battery circuit, thereby balancing the battery voltages of the batteries.

10 Claims, 4 Drawing Sheets

(56) References Cited

FOREIGN PATENT DOCUMENTS

| | | | | |
|---|---|---|---|---|
| JP | 2000511398 | A | * | 8/2000 |
| JP | 2015100214 | A | * | 5/2015 |

OTHER PUBLICATIONS

"Analysis and Design Considerations of Integrated 3-Level Buck Converters", by Xun Liu et al., IEEE Transactions on Circuits and Systems, vol. 63, No. 5, May 2016.
"Constant On-Time 3-Level Buck Converter for Low Power Applications", by Brian M. Cassidy et. al, IEEE, 2015.

* cited by examiner

CHARGER CIRCUIT AND CHARGING CONTROL METHOD

CROSS REFERENCE

The present invention claims priority to CN 201910388026.0 filed on May 10, 2019.

BACKGROUND OF THE INVENTION

Field of Invention

The present invention relates to a charger circuit and a charging control method; particularly, it relates to such charger circuit and such charging control method which are capable of balancing respective battery voltages of a group of batteries connected in series.

Description of Related Art

Prior arts relevant to the present invention are: "A 50 MHz 5V 3 W 90% Efficiency 3-Level Buck Converter with Real-Time Calibration", by Xun Liu et al., Symposium on VLSI Circuits Digest of Technical Papers, 2016; "Analysis and Design Considerations of Integrated 3-Level Buck Converters", by Xun Liu et al., IEEE TRANSACTIONS ON CIRCUITS AND SYSTEMS, Vol. 63, No. 5, May 2016; and "Constant ON-Time 3-Level Buck Converter for Low Power Applications", by Brian M. Cassidy et. al, IEEE, 2015.

Figure 1:
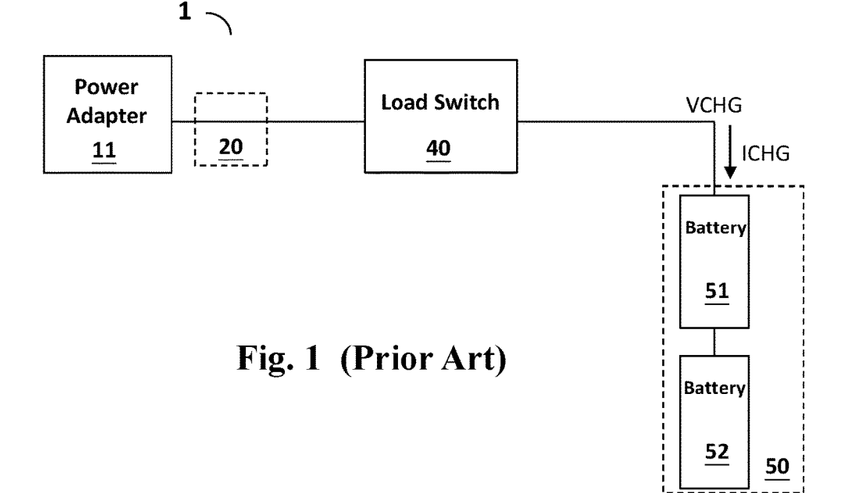
FIG. 1 shows a schematic diagram of a conventional charger circuit.

Please refer to FIG. 1, which shows a schematic diagram of a conventional charger circuit (i.e., conventional charger circuit 1). The conventional charger circuit 1 comprises a power adapter 11 which provides a direct-charging function. The power adapter 11 can supply a DC current or a DC voltage which is supplied through a cable 20 (e.g., USB cable) and a load switch 40 to charge a battery circuit 50 by constant current (CC) charging operation or by constant voltage (CV) charging operation on. The DC current is approximately equal to the charging current ICHG. The battery circuit 50 for example includes batteries 51 and 52 connected in series.

The prior art shown in FIG. 1 has the following drawback that: in practical application, the voltage of the battery 51 is often different from the voltage of the battery 52; under such circumstance, because the conventional charger circuit 1 determines whether the charging operation is completed only according to the charging voltage VCHG (which is a sum of the voltage of the battery 51 and the voltage of the battery 52), it often occurs that one of the battery 51 and the battery 52 is overcharged and the other is undercharged.

In view of the above, to overcome the drawback in the prior art, the present invention proposes a charger circuit and a charging control method which are capable of balancing respective battery voltages of a group of batteries connected in series.

SUMMARY OF THE INVENTION

From one perspective, the present invention provides a charger circuit, which is configured to operably supply a charging power to charge a battery circuit, wherein the battery circuit includes a plurality of batteries connected in series; the charger circuit comprising: a conversion switch circuit coupled between a charging voltage of the charging power and a ground level, wherein the conversion switch circuit includes a plurality of conversion switches connected in series, wherein the conversion switch circuit has a plurality of battery voltage balancing nodes which are electrically connected to the battery circuit, such that each battery is electrically connected between two of the battery voltage balancing nodes; at least one capacitor, which is coupled to the conversion switch circuit; and a conversion control circuit coupled to the conversion switch circuit, wherein the conversion control circuit is configured to operably provide a plurality of operation signals to the conversion switch circuit, to respectively control the corresponding conversion switches, so that the capacitor is periodically connected in parallel to each battery of the battery circuit, thereby balancing the battery voltages of the batteries.

In one embodiment, the charger circuit further comprises: a power delivery unit, which is coupled to the conversion switch circuit, the power delivery unit being configured to operably convert a power to an input power, so that the charger circuit convert the input power to the charging power.

In one embodiment, the charger circuit further comprises: a cable which is configured to operably connect the power delivery unit to the conversion switch circuit, wherein the cable complies with an universal serial bus (USB) specification or an USB power delivery (USB PD) specification, wherein the cable includes a power line and a signal line, wherein the power line is configured to be operably coupled to the power, whereas, the signal line is configured to operably transmit a power related signal.

In one embodiment, under both a situation where the battery circuit is being charged and a situation where the battery circuit is supplying a battery power to a load circuit, the conversion control circuit provides the plurality of operation signals to the conversion switch circuit, to respectively control the corresponding conversion switches so that the capacitor is periodically connected in parallel to respective battery of the battery circuit, thereby balancing the voltage of the respective corresponding battery.

In one embodiment, the charger circuit further comprises: a power loop transistor, which is coupled between the battery circuit and the load circuit, the power loop transistor being configured to operably control the battery power.

In one embodiment, the charger circuit further comprises: at least one reverse blocking switch circuit, which is connected in series to the conversion switch circuit, the at least one reverse blocking switch circuit being configured to operably block a parasitic body current flowing through a body diode of at least one of the conversion switches, wherein the at least one reverse blocking switch circuit includes at least one reverse blocking switch, wherein the at least one reverse blocking switch has a body diode which is reversely coupled to the body diode of the conversion switch.

From another perspective, the present invention provides a charging control method for supplying a charging power to charge a battery circuit, wherein the battery circuit includes a plurality of batteries connected in series; the charging control method comprising: providing a conversion switch circuit, wherein the conversion switch circuit is coupled between a charging voltage of the charging power and a ground level, wherein the conversion switch circuit has a plurality of battery voltage balancing nodes which are electrically connected to the battery circuit, such that each battery is electrically connected between two of the battery voltage balancing nodes; providing at least one capacitor, wherein the at least one capacitor is coupled to the conversion switch circuit; and providing a plurality of operation signals to the conversion switch circuit, to respectively control the corresponding conversion switches, so that the capacitor is periodically connected in parallel to each battery of the battery circuit, thereby balancing the battery voltages of the batteries.

The objectives, technical details, features, and effects of the present invention will be better understood with regard to the detailed description of the embodiments below, with reference to the accompanying drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 2:
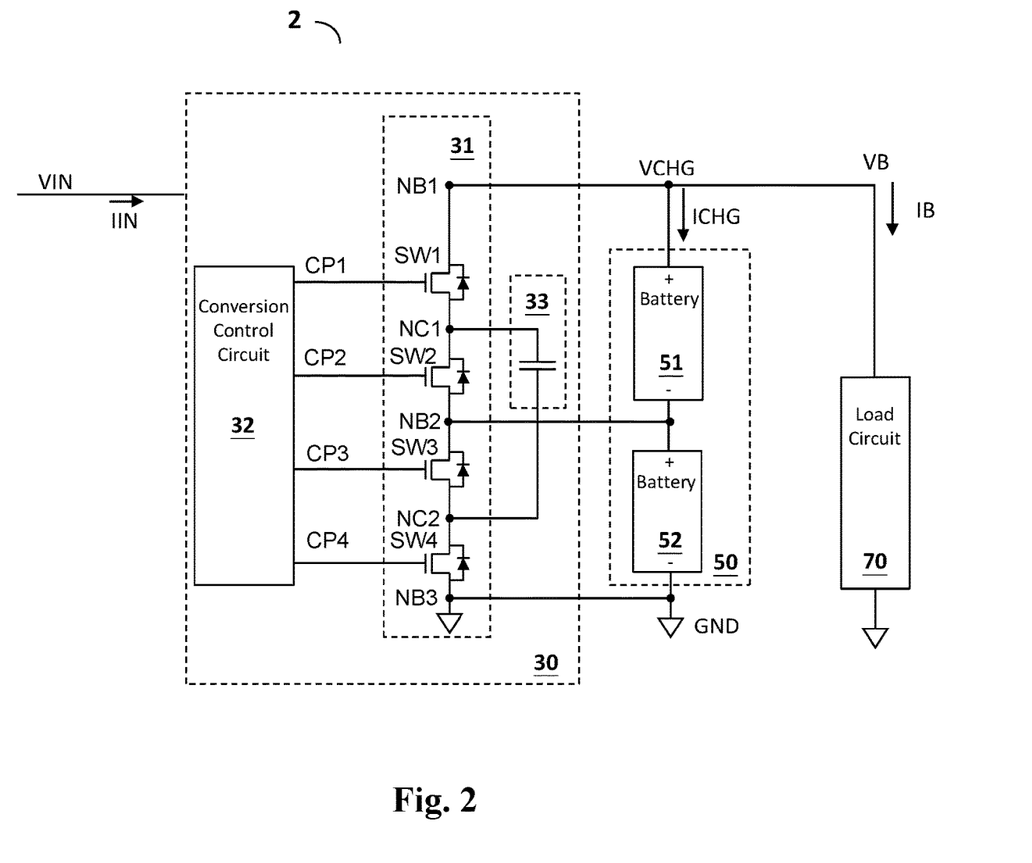
FIG. 2 shows a schematic diagram of a charger circuit according to an embodiment of the present invention.

Please refer to FIG. 2, which shows a schematic diagram of a charger circuit (i.e., charger circuit 2) according to an embodiment of the present invention. The charger circuit 2 is configured to operably supply a charging power to charge a battery circuit 50. The battery circuit 50 includes a battery 51 and a battery 52 connected in series. An input power including an input voltage VIN and an input current IIN is supplied to the charger circuit 2. The charging power includes a charging voltage VCHG and a charging current ICHG. The charger circuit 2 comprises a power converter circuit 30. In one embodiment, the power converter circuit 30 includes a conversion switch circuit 31, a conversion control circuit 32 and a capacitor 33.

Please still refer to FIG. 2. The conversion switch circuit 31 is coupled between the charging voltage VCHG and a ground level GND. The conversion switch circuit 31 includes conversion switches SW1, SW2, SW3 and SW4 connected in series. The conversion switch circuit 31 has battery voltage balancing nodes NB1, NB2 and NB3 which are electrically connected to the battery circuit 50. As shown in FIG. 2, an anode (+) and a cathode (−) of the battery 51 are electrically connected to the corresponding battery voltage balancing nodes NB1 and NB2. An anode (+) and a cathode (−) of the battery 52 are electrically connected to the corresponding battery voltage balancing nodes NB2 and NB3. According to the present invention, in one embodiment, the charger circuit 2 includes at least one capacitor 33, which is coupled to the conversion switch circuit 31. The conversion control circuit 32 is coupled to the conversion switch circuit 31. In one embodiment, the conversion control circuit 32 is configured to operably provide operation signals CP1, CP2, CP3 and CP4 to the conversion switch circuit 31, to respectively control the corresponding conversion switches SW1, SW2, SW3 and SW4, so that the capacitor 33 can be periodically connected in parallel to each battery (i.e., battery 51 or battery 52 in this embodiment) of the battery circuit 50, thereby balancing the battery voltages of the batteries (i.e., battery 51 and battery 52 in this embodiment). It should be understood that the number of the capacitor 33 is not limited to one; in other embodiments, the charger circuit 2 can include plural capacitors 33, as long as these plural capacitors 33 can be periodically connected in parallel to each battery of the battery circuit 50, thereby balancing the battery voltages of the batteries. The connection phases of the capacitors with the batteries can be designed as required, as long as the battery voltages of the batteries can be balanced.

It is noteworthy that, in the present invention, although it is preferred for the battery voltages of the batteries of the battery circuit 50 to be exactly equal to one another, however due to non-idealities caused by for example imperfection of components or imperfect matching among components, the battery voltages of the batteries may not be exactly equal to one another, but just close to (approximately equal to) one another. In other words, according to the present invention, a certain level of error between the battery voltages of the batteries is acceptable, and therefore the phrase "balancing the battery voltages of the batteries" allows an insignificant error within a tolerable range. In addition, it is worthwhile noting that, the charger circuit of the present invention can balance the battery voltages of the batteries not only during the charging operation, but also during a situation where the battery circuit 50 is supplying a battery power (including a battery voltage VB and a battery current IB) to a load circuit 70. Under the above-mentioned situation where the battery circuit 50 is supplying the battery power to the load circuit 70, the conversion control circuit 32 can provide the operation signals CP1, CP2, CP3 and CP4 to the conversion switch circuit 31, to respectively control the corresponding conversion switches SW1, SW2, SW3 and SW4, so that the capacitor 33 can be periodically connected in parallel to each battery (i.e., battery 51 or battery 52 in this embodiment) of the battery circuit 50, thereby balancing the battery voltages of the batteries (i.e., battery 51 and battery 52 in this embodiment).

Figure 3:
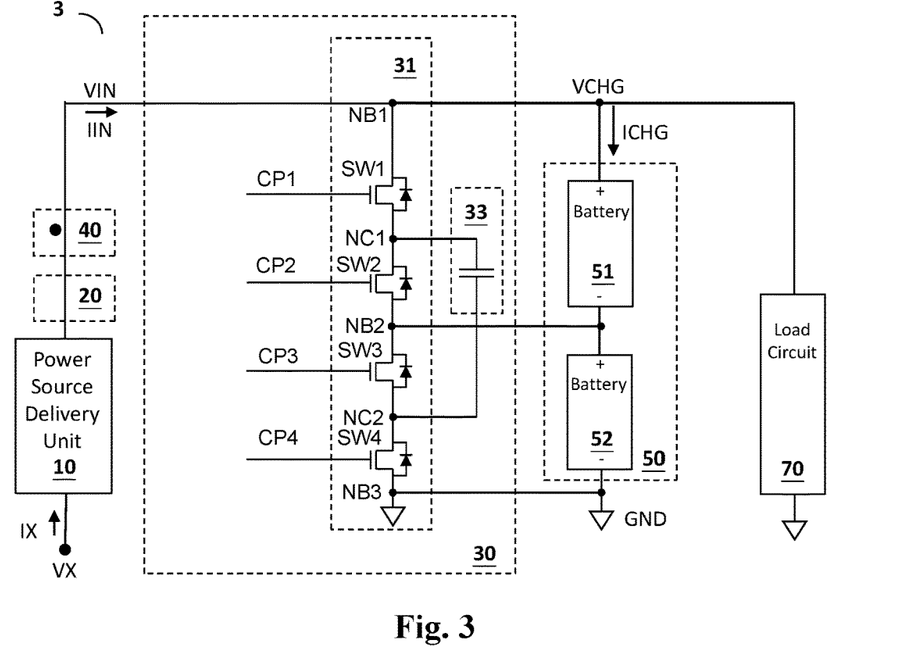
FIG. 3 shows a schematic diagram of a charger circuit according to another embodiment of the present invention.

Please refer to FIG. 3, which shows a schematic diagram of a charger circuit (i.e., charger circuit 3) according to another embodiment of the present invention. As compared to the charger circuit 2 in the previous embodiment shown in FIG. 2, the charger circuit 3 in this embodiment further comprises a power delivery unit 10. The power delivery unit 10 is configured to operably convert another power (including a voltage VX and a current IX) to the above-mentioned input power (including the input voltage VIN and the input current IIN). In one embodiment, the power delivery unit 10 can be, for example but not limited to, a power adapter, which can convert a power (corresponding to the power) in AC form to the above-mentioned input power. In another embodiment, the power delivery unit 10 can be, for example but not limited to, a DC-DC converter circuit, which can convert a battery power (corresponding to the power) generated from for example a power bank to the above-mentioned input power. In one embodiment, the power delivery unit 10 can regulate the input voltage VIN to a predetermined voltage level or regulate the input current IIN to a predetermined current level.

Please still refer to FIG. 3. In one embodiment, the charger circuit 3 of the present invention can further include at least one connector (e.g., as shown by the connector 40 in FIG. 3). Or, in another embodiment, the charger circuit 3 of the present invention can further include at least one connector and a cable (e.g., as shown by the connector 40 and the cable 20 in FIG. 3). In the embodiments described above, the connector 40 and/or the cable 20 is configured to operably connect the power delivery unit 10 to the power converter circuit 30. In one embodiment, the power delivery unit 10, the at least one connector (e.g., the connector 40 in FIG. 3) and the cable (e.g., the cable 20 in FIG. 3) comply with an universal serial bus power delivery (USB PD) specification and/or an USB type-C specification and/or an USB quick charge (USB Quick Charge) specification. The cable (e.g., the cable 20 in FIG. 3) can include a power line and a signal line. The power line is configured to be coupled to the power, whereas, the signal line is configured to transmit a power related signal.

Figure 4:
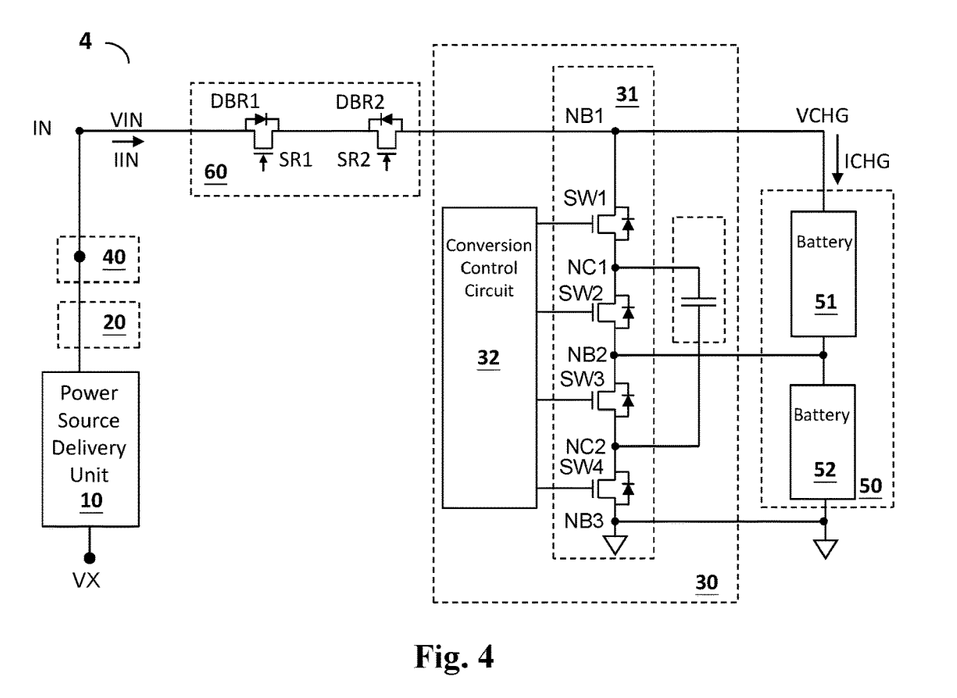
FIG. 4 shows a schematic diagram of a charger circuit according to yet another embodiment of the present invention.

Please refer to FIG. 4, which shows a schematic diagram of a charger circuit (i.e., charger circuit 4) according to yet another embodiment of the present invention. As compared to the charger circuit 3 in the previous embodiment shown in FIG. 3, the charger circuit 4 in this embodiment further comprises at least one reverse blocking switch circuit 60. The reverse blocking switch circuit 60 is connected in series to the battery circuit 50 and the conversion switch circuit 31. The reverse blocking switch circuit 60 is configured to operably block a parasitic body current which may flow through the body diodes of the conversion switches SW1, SW2, SW3 and SW4. The reverse blocking switch circuit 60 includes at least one reverse blocking switch (i.e., reverse blocking switch SR1 and reverse blocking switch SR2 in this embodiment). Each reverse blocking switch (i.e., reverse blocking switch SR1 and reverse blocking switch SR2 in this embodiment) includes a body diode (i.e., body diode DBR1 and body diode DBR2 in this embodiment), and in this embodiment, the body diode of at least one reverse blocking switch reverse blocking switch (i.e., reverse blocking switch SR1 and/or reverse blocking switch SR2 in this embodiment) is reversely coupled to the body diode of at least one conversion switch (i.e., conversion switches SW1, SW2, SW3 and/or SW4 in this embodiment). More specifically:

The reverse blocking switch circuit 60 is connected in series to the battery circuit 50 and the conversion switch circuit 31. The reverse blocking switch circuit 60 is configured to operably block a parasitic body current which may flow through the body diodes of the conversion switches SW1, SW2, SW3 and SW4. The reverse blocking switch circuit 60 has at least one reverse blocking switch (e.g., the reverse blocking switch SR1) which has a body diode (e.g., the body diode DBR1) that is reversely coupled to the body diode of the at least one conversion switch (e.g., the conversion switches SW1, SW2, SW3 and SW4). Because the body diode of the at least one reverse blocking switch reverse blocking switch is reversely coupled to the body diode of the at least one conversion switch, even under a situation where, for example, the power delivery unit 10 is plug-out or the input voltage VIN is smaller than the charging voltage VCHG, the charger circuit of the present invention will be able to block the above-mentioned parasitic body current from flowing.

Figure 5:
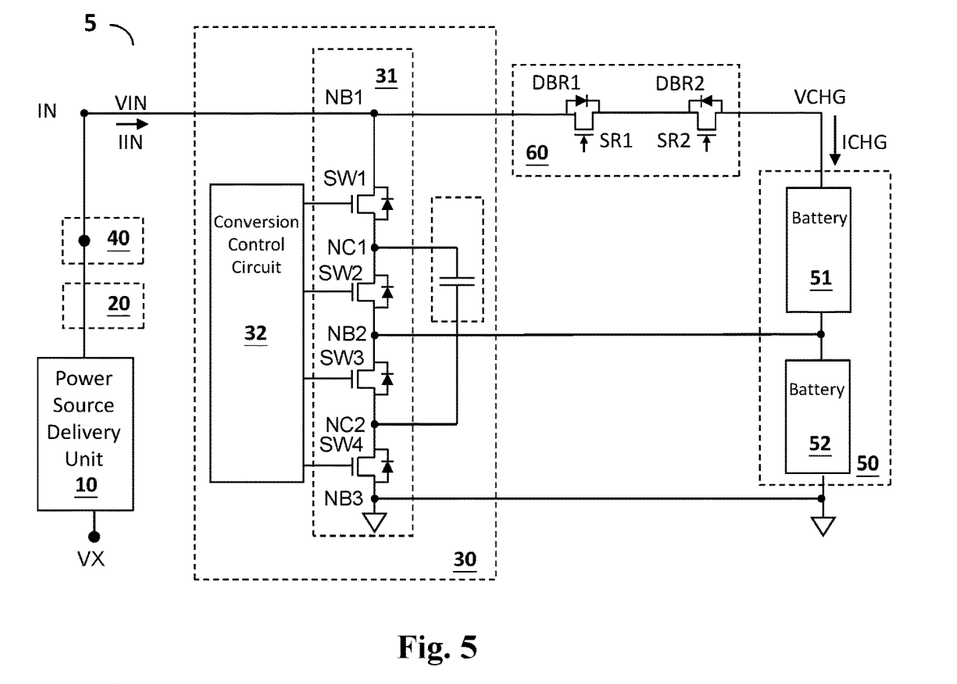
FIG. 5 shows a schematic diagram of a charger circuit according to still another embodiment of the present invention.

In the embodiment shown in FIG. 4, the reverse blocking switch circuit 60 of the charger circuit 4 is coupled in series between the power delivery unit 10 and the conversion switch circuit 31; in another embodiment shown in FIG. 5, the reverse blocking switch circuit 60 of the charger circuit 5 can be coupled in series between the conversion switch circuit 31 and the battery circuit 50. The embodiments of FIG. 4 and FIG. 5 show that, the above-mentioned parasitic body current can be blocked from flowing as long as "the reverse blocking switch circuit 60 is connected in series to the battery circuit 50 and the conversion switch circuit 31" and "the body diode of the at least one reverse blocking switch reverse blocking switch is reversely coupled to the body diode of the at least one conversion switch".

In one embodiment, the reverse blocking switch circuit (e.g., the reverse blocking switch circuit 60 in FIG. 4 and FIG. 5) can be a load switch circuit. The load switch circuit includes two or more load switches (e.g., the reverse blocking switch SR1 and the reverse blocking switch SR2 of the reverse blocking switch circuit 60 in FIG. 4 and FIG. 5), and when the load switches are implemented by metal-oxide-semiconductor (MOS) transistors, the body diodes (e.g., the body diode DBR1 and the body diode DBR2) of the load switches are coupled reversely as shown in FIG. 4 and FIG. 5.

Figure 6:
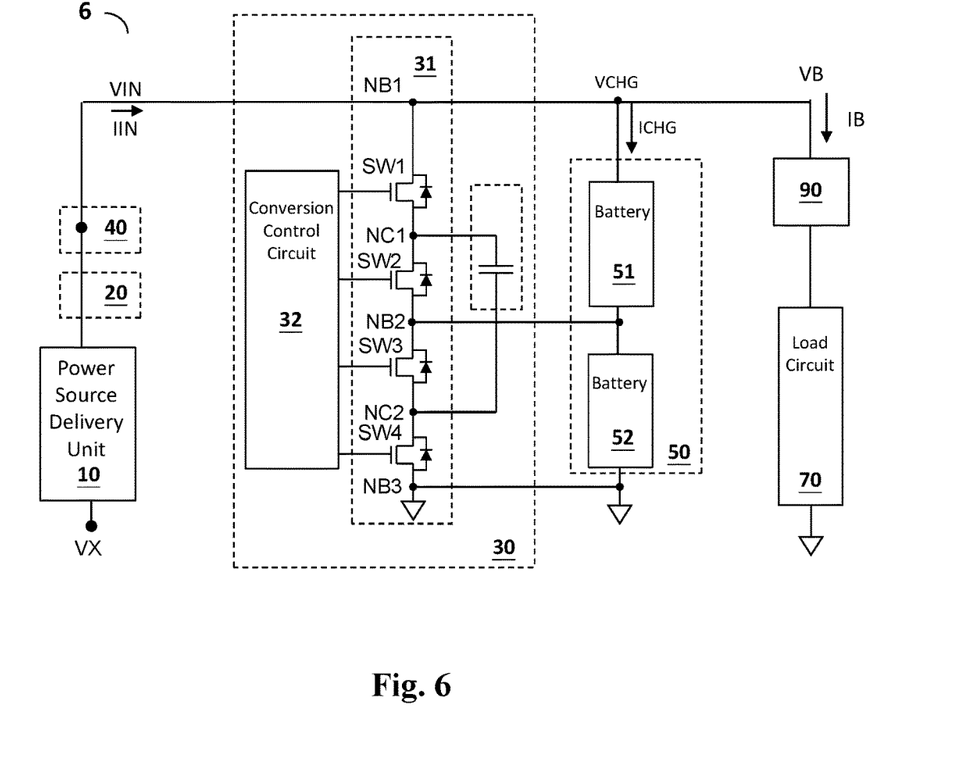
FIG. 6 shows a schematic diagram of a charger circuit according to still another embodiment of the present invention.

Please refer to FIG. 6, which shows a schematic diagram of a charger circuit (i.e., charger circuit 6) according to still another embodiment of the present invention. As compared to the charger circuit 3 in the previous embodiment shown in FIG. 3, the charger circuit 6 in this embodiment further comprises a power loop transistor 90. The power loop transistor 90 is coupled between the battery circuit 50 and the load circuit 70. The power loop transistor 90 is configured to operably control the battery power. In one embodiment, the power loop transistor 90 can be controlled to be conductive, so that the battery power is directly electrically connected to the load circuit 70. In one embodiment, the conduction level (e.g., fully conductive or partially conductive) of the power loop transistor 90 is controllable according to a voltage status of the battery circuit 50 and a power demand of the load circuit 70, by regulating for example but not limited to a conductive resistance of the power loop transistor 90. In another embodiment, the present invention can control the power loop transistor 90, so as to regulate for example but not limited to the battery voltage VB or the battery current IB.

Figure 7:
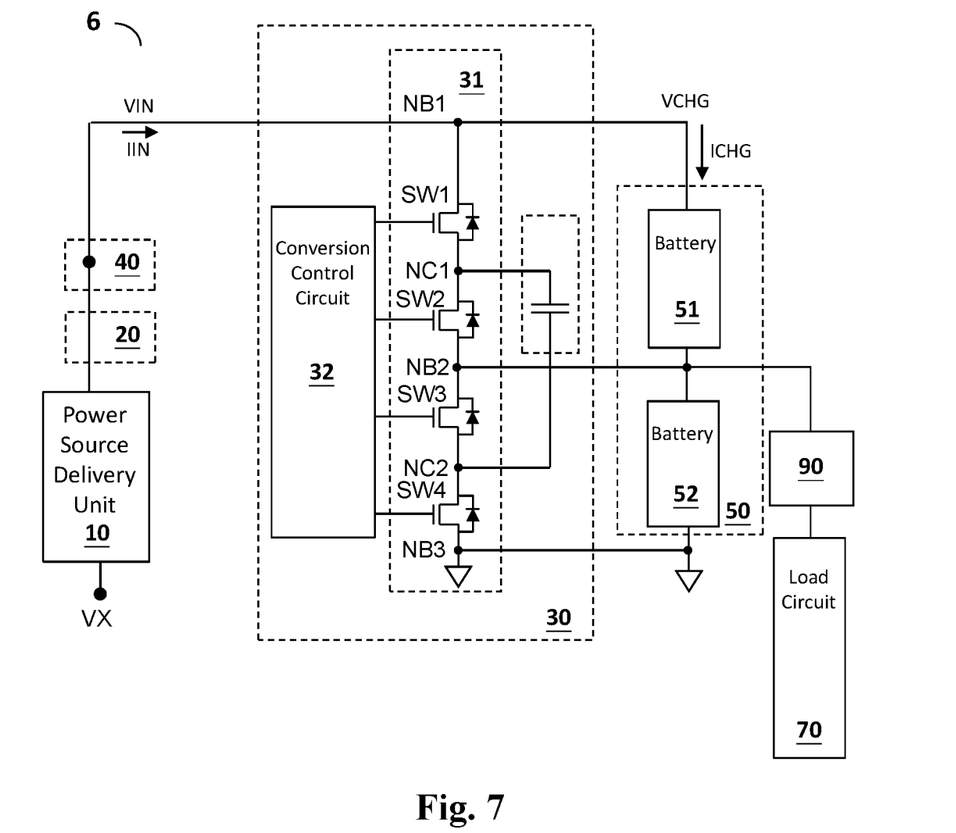
FIG. 7 shows a schematic diagram of a charger circuit according to still another embodiment of the present invention.

Please refer to FIG. 7, which shows a schematic diagram of a charger circuit (i.e., charger circuit 7) according to still another embodiment of the present invention. As compared to the charger circuit 6 in the previous embodiment shown in FIG. 6, in the charger circuit 7 in this embodiment, the power loop transistor 90 has one end electrically connected to a node between the battery 51 and the battery 52 and another end electrically connected to the load circuit 70. This embodiment shows that one end of the power loop transistor 90 can be electrically connected between the batteries connected in series.

Figure 8:
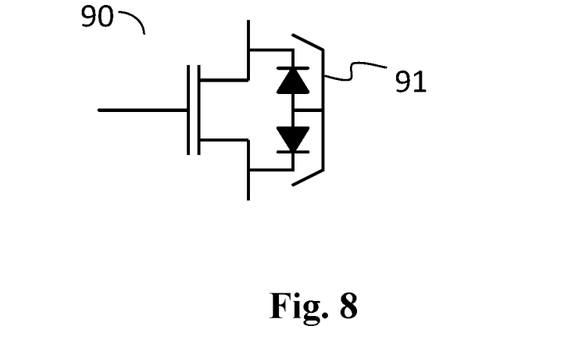
FIG. 8 shows an embodiment of a power loop transistor.

Please refer to FIG. 8, which shows an embodiment of a power loop transistor (i.e., power loop transistor 90). In one embodiment, the power loop transistor 90 includes one single transistor. In another embodiment, the power loop transistor 90 includes plural transistors. In the single-transistor embodiment, the power loop transistor 90 can include a bias-switchable well 91 whose bias level is switchable. In one embodiment, the power loop transistor 90 can adaptively switch the bias level of the well 91 according to a drain-source voltage relationship of the power loop transistor 90 or a current direction of the power loop transistor 90. For example, in one embodiment, the well 91 can be electrically connected to a drain or a source of the power loop transistor 90.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, the reverse blocking switch circuit (e.g., in the charger circuit 4) can be applied in other embodiments. For another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A charger circuit, which is configured to operably supply a charging power to charge a battery circuit according to an input power, the input power including an input voltage and an input current, wherein the battery circuit includes a plurality of batteries connected in series; the charger circuit comprising:
    a conversion switch circuit coupled between a charging voltage of the charging power and a ground level, wherein the conversion switch circuit includes a plurality of conversion switches connected in series, wherein the conversion switch circuit has a plurality of battery voltage balancing nodes which are electrically connected to the battery circuit, such that each battery is electrically connected between two of the battery voltage balancing nodes;
    at least one capacitor, which is coupled to the conversion switch circuit; and
    a conversion control circuit coupled to the conversion switch circuit, wherein the conversion control circuit is configured to operably provide a plurality of operation signals to the conversion switch circuit, to respectively control the corresponding conversion switches, so that the capacitor is periodically connected in parallel to each battery of the battery circuit, thereby balancing the battery voltages of the batteries;
    wherein a number of the capacitor is less than half of a number of the conversion switches;
    whereby the charger circuit provides a voltage division function at each node between the batteries such that a voltage at the each node is a divided voltage of the input voltage and a total charging current to the batteries is larger than the input current.

2. The charger circuit of claim 1, further comprising:
    a power delivery unit, which is coupled to the conversion switch circuit, the power delivery unit being configured to operably convert a power to an input power, so that the charger circuit convert the input power to the charging power.

3. The charger circuit of claim 2, further comprising:
    a cable, which is configured to connect the power delivery unit to the conversion switch circuit, wherein the cable complies with an universal serial bus (USB) specification or an USB power delivery (USB PD) specification, wherein the cable includes a power line and a signal line, wherein the power line is configured to be coupled to the power, whereas, the signal line is configured to transmit a power related signal.

4. The charger circuit of claim 1, wherein under both a situation where the battery circuit is being charged and a situation where the battery circuit is supplying a battery power to a load circuit, the conversion control circuit provides the plurality of operation signals to the conversion switch circuit, to respectively control the corresponding conversion switches so that the capacitor is periodically connected in parallel to respective battery of the battery circuit, thereby balancing the voltage of the respective corresponding battery.

5. The charger circuit of claim 4, further comprising:
    a power loop transistor, which is coupled between the battery circuit and the load circuit, the power loop transistor being configured to operably control the battery power.

6. The charger circuit of claim 1, further comprising:
    at least one reverse blocking switch circuit, which is connected in series to the conversion switch circuit, the at least one reverse blocking switch circuit being configured to operably block a parasitic body current flowing through a body diode of at least one of the conversion switches, wherein the at least one reverse blocking switch circuit includes at least one reverse blocking switch, wherein the at least one reverse blocking switch has a body diode which is reversely coupled to the body diode of the conversion switch.

7. A charging control method for supplying a charging power to charge a battery circuit according to an input power, the input power including an input voltage and an input current, wherein the battery circuit includes a plurality of batteries connected in series; the charging control method comprising:
    providing a conversion switch circuit, wherein the conversion switch circuit is coupled between a charging voltage of the charging power and a ground level, wherein the conversion switch circuit includes a plurality of conversion switches connected in series, wherein the conversion switch circuit has a plurality of battery voltage balancing nodes which are electrically connected to the battery circuit, such that each battery is electrically connected between two of the battery voltage balancing nodes;
    providing at least one capacitor, wherein the at least one capacitor is coupled to the conversion switch circuit; and
    providing a plurality of operation signals to the conversion switch circuit, to respectively control the corresponding conversion switches, so that the capacitor is periodically connected in parallel to each battery of the battery circuit, thereby balancing the battery voltages of the batteries;

wherein a number of the capacitor is less than half of a number of the conversion switches;

whereby the charger circuit provides a voltage division function at each node between the batteries such that a voltage at the each node is a divided voltage of the input voltage and a total charging current to the batteries is larger than the input current.

8. The charging control method of claim 7, further comprising:

supplying a battery power to a load circuit via the battery circuit, wherein under both a situation where the battery circuit is being charged and a situation where the battery circuit is supplying a battery power to a load circuit, the conversion control circuit provides the plurality of operation signals to the conversion switch circuit, to respectively control the corresponding conversion switches so that the capacitor is periodically connected in parallel to respective battery of the battery circuit, thereby balancing the voltage of the respective corresponding battery.

9. The charging control method of claim 8, further comprising:

providing a power loop transistor, wherein the power loop transistor is coupled between the battery circuit and the load circuit, the power loop transistor being configured to operably control the battery power.

10. The charging control method of claim 7, further comprising:

providing at least one reverse blocking switch circuit, which is connected in series to the conversion switch circuit, the at least one reverse blocking switch circuit being configured to operably block a parasitic body current flowing through a body diode of at least one of the conversion switches, wherein the at least one reverse blocking switch circuit includes at least one reverse blocking switch, wherein the at least one reverse blocking switch has a body diode which is reversely coupled to the body diode of the conversion switch.

* * * * *